United States Patent
Kuszaj et al.

[11] Patent Number: 5,580,621
[45] Date of Patent: Dec. 3, 1996

[54] POLYESTER BACKED ACRYLIC COMPOSITE MOLDED STRUCTURE AND METHOD OF MANUFACTURING THEREOF

[75] Inventors: Karl T. Kuszaj, East Brunswick, N.J.; Ronald D. Barndt, Tatamy, Pa.; Jeffrey E. Willis, Lawrenceville, N.J.

[73] Assignee: American Standard Inc., Piscataway, N.J.

[21] Appl. No.: 164,646

[22] Filed: Dec. 8, 1993

Related U.S. Application Data

[63] Continuation of Ser. No. 881,943, May 12, 1992, abandoned, which is a continuation-in-part of Ser. No. 516,284, Apr. 30, 1990, abandoned.

[51] Int. Cl.$^6$ ................................................. B29C 39/12
[52] U.S. Cl. ................... 428/34.1; 428/35.7; 428/15; 428/482; 428/483; 4/538; 4/580; 4/581; 4/584; 4/619
[58] Field of Search ........................ 428/35.7, 364, 428/482, 483, 34.1; 4/538, 580, 581, 584, 619

[56] References Cited

U.S. PATENT DOCUMENTS

| | | | |
|---|---|---|---|
| 2,695,256 | 11/1954 | De Olloqui et al. | 4/538 |
| 3,582,388 | 6/1971 | Stayner | 117/27 |
| 3,707,434 | 12/1972 | Stayner | 161/161 |
| 3,720,540 | 3/1973 | Wimmer | 117/139 |
| 4,082,882 | 4/1978 | Weinstein et al. | 428/246 |
| 4,126,719 | 11/1978 | Koyanagi et al. | 428/35 |
| 4,290,154 | 9/1981 | Benjamin | 4/538 |
| 4,664,982 | 5/1987 | Genovese et al. | 428/417 |
| 4,844,944 | 7/1989 | Graefe et al. | 428/35.7 |

FOREIGN PATENT DOCUMENTS

| | | | |
|---|---|---|---|
| 0002953 | 7/1979 | European Pat. Off. | B29D 3/02 |
| 0370918 | 5/1990 | France . | |
| 843863 | 8/1960 | United Kingdom . | |
| 2040676 | 3/1980 | United Kingdom . | |
| 2087295 | 5/1982 | United Kingdom | B29D 3/00 |
| 0399707 | 11/1990 | United Kingdom . | |

*Primary Examiner*—James J. Seidleck
*Assistant Examiner*—Michael A. Williamson
*Attorney, Agent, or Firm*—Elaine Brenner Roinson; Ann M. Knab

[57] ABSTRACT

A polymeric composite structure having a polymeric shell layer with a finish-side and a non-finish side and a cross-linked thermosetting polymeric backing layer and method of manufacturing thereof is provided. The cross-linked thermosetting polymeric backing layer is simultaneously molded to conform to the shape of and bonded directly to essentially the entire non-finish side of the polymeric shell layer. The method includes forming the polymeric shell having a finish-side and non-finish side into a suitable shape, placing the shell into a mold, and introducing an uncured blended mixture of unsaturated thermosetting polymeric backing material and cross-linking promoter into the mold to force the backing material to directly coat the non-finish side of the shell. Curing the molded thermosetting polymeric backing material at a suitable temperature and sufficient time allows hardening and cross-linking of the thermosetting polymeric material and bonding directly to the non-finish side of the polymeric shell to permit demolding of the composite structure without damage.

5 Claims, 9 Drawing Sheets

POLYESTER BACKED ACRYLIC COMPOSITE MOLDED STRUCTURE AND METHOD OF MANUFACTURING THEREOF

This application is a continuation of U.S. patent application Ser. No. 07/881,943, filed on May 12, 1992 now abandonded, for POLYESTER BACKED ACRYLIC COMPOSITE MOLDED STRUCTURE AND METHOD OF MANUFACTURING THEREOF, which is a continuation-in-part application of U.S. patent application Ser. No. 07/516,284, filed on Apr. 30, 1990 now abandonded.

BACKGROUND OF THE INVENTION

1. Field of the Invention

This invention relates to a polyester backed acrylic composite molded structure. More particularly, it relates to a composite structure having a polyester polymeric backing material applied during a molding process to an acrylic shell for manufacturing of lightweight durable articles such as sanitary fixtures including bathtubs, sinks, shower receptors, lavatories and the like which are lightweight, and resist damage and delamination when subjected to impact, the weight of the user and thermal shock.

2. Background of the Related Art

In the development of bathroom and kitchen fixtures, as well as bathtubs, whirlpool tubs and other composite articles, the traditional porcelain-cast iron fixtures have gradually been replaced by lighter and more resilient composite structures. While porcelain-cast iron and enameled fixtures had the advantage of having a very solid feel and a high weight bearing capability, one disadvantage of these fixtures has been their susceptibility to impact damage and extreme weight which causes great difficulties in moving and installing large fixtures such as sinks, bathtubs and whirlpool tubs.

Initial attempts by the industry to replace these porcelain-cast iron fixtures were unsuccessful. The early composite structures had a plastic, hollow feel which would deform, crack, chip or delaminate when subjected to impact, thermal shock, or the weight of the typical bather. In addition, these composite structures would often delaminate, crack, craze or chip when subjected to impact from the outside of the structure during manufacturing, transportation and installation of the fixture.

A successful solution to these problems is disclosed in U.S. Pat. No. 4,664,982 to Genovese et al., and in U.S. Pat. No. 5,049,443 to Kuszaj et al., the disclosure of both of which are incorporated by reference herein. Both disclose composite enamelled steel or stainless steel fixtures which have the look and feel of the earlier porcelain-cast iron fixtures. The structures are-light, have high structural strength, and resist delamination, chipping and denting due to impact or thermal shock. The composite structures are formed from a steel or stainless steel which may be enamelled on one or both of its faces. The excellent physical and mechanical properties are imparted to these shells as a result of the chemical bonding of a plastic layer to a non-finish side of the shell. The preferred plastic layer is an isocyanate-modified thermosetting unsaturated polyester or polyether foam which is introduced into a mold containing the shell by reaction injection molding (RIM), or by reinforced reaction injection molding ("RRIM") processing. The foamed plastic is chemically bonded to the shell by the action of silane, a coupling agent which creates chemical linkages between the metallic groups or the SiOH groups in the enamel and the reinforced foamed plastic to form the laminate. These composite structures possess excellent physical and mechanical properties as a result of the chemical bonding of the reinforced foamed polymeric layer to the enamel steel or stainless steel shell. These disclosures do not relate, however, to the manufacture of a composite structure in which an acrylic layer is bonded to a polymeric or plastic molded structure.

Another solution to these problems was the use of a polymeric, cosmetic surface layer bonded directly to a foamed plastic substrate, described as a cross-linked isocyanate-modified thermosetting unsaturated polyester or polyether resin layer to provide a high impact strength, delamination-resistant structure. These structures and their processes of manufacture are disclosed in U.S. Pat. Nos. 4,844,944 and 4,844,955 both to Graefe et al., the disclosures of which are incorporated by reference herein. Methylmethacrylate and commercially available adhesive Thixon 416, manufactured by Whittaker Corp., West Alexandria, Ohio, which contains a blend of 65% solvents, 35% solids including polyurethane phenolic and epoxy resins, was used as a primer to cross-link and chemically bond the polymeric cosmetic layer to the isocyanate groups in the foamed plastic while plastic is cured. The isocyanate was provided in the foamed plastic to provide a very fast cure of the plastic layer during RIM, or RRIM molding.

However, one of the disadvantages of the reaction molding processes discussed above is that the molding processes are carried out under high pressures and require a large and expensive hydraulic press to keep the mold closed and prevent the escape of the reacting polymeric foam during the molding process. Although these molding procedures result in a very fast cure time, the equipment required, such as the hydraulic mold press is expensive, requiring a high capital investment.

Accordingly, it is desirable to provide an improved polymeric composite molded structure and a method of producing same.

SUMMARY OF THE INVENTION

Generally speaking, in accordance with the present invention, a polymeric composite structure, preferably formed in the configuration of a bathtub, and a method for manufacturing thereof, is provided. The polymeric composite structure includes a polymeric shell layer, preferably made from a thermoformable acrylic polymer of polymethylmethacrylate having a finish-side and a non-finish side.

The polymeric composite structure also includes a molded, cross-linked thermosetting polymeric backing layer. The cross-linked thermosetting polymeric layer is bonded to the non-finish side of the polymeric shell and may include at least one of the following components: polyester, epoxy, acrylic, or vinyl esters, alone or blended in combination, but does not contain isocyanate. Preferably, this cross-linked thermosetting backing, prior to curing includes a rigid unsaturated polyester resin, flexible unsaturated polyester resin, a curing promoter, a peroxide cross-linking promoter and a filler in a ratio from about 2:1 resin to filler to about 1:30 resin to filler. The filler may include calcium carbonate, aluminum trihydrate, glass spheres, sand, ceramic, mica, talc, silica, and mixtures containing one or more of these fillers.

In a first and second embodiment of the invention, a fiber reinforced resin layer which may include a layer of fibers such as fiberglass, carbon, ceramic, boron, graphite, woolastonite, aromatic polyamide and mixtures thereof are adhered to the non-finish side of the acrylic shell. Preferably such layers are made of chopped fiberglass in a resinous backing. A weight bearing reinforcing structure is adhered to the non-finish side of the shell and to the fiber reinforced resin layer. This weight bearing reinforcing structure may include wood, such as chip-board, particle-board, plywood and wooden planks or it may include a polymeric composite or inorganic weight bearing structures. Preferably, the weight bearing structure is a rectangular wooden structure made from chip-board placed below the floor portion of the bathtub. Additionally, a plurality of reinforcing wooden planks are placed below the deck portion of the shell of the tub.

It is preferred that the non-finish side of the shell in the first and second embodiments of the invention is bonded to the fiber reinforcing layer by a silane based coupler which is made from a silane based primer and a methylmethacrylate and solvent blend. The methylmethacrylate and solvent blend preferably includes methylene chloride, styrene and water, while the silane based primer composition suitably includes 3[2(vinyl benzylamino)ethylamino] propyltrimethoxy silane dissolved in a solution of toluene, butanol, 2-butoxy ethyanol and ethyl alcohol. The cross-linked thermosetting polymeric backing layer, which is bonded to the non-finish side of the polymeric shell, surrounds the fiber reinforcing resin layer and the weight bearing reinforcing structure.

In a third and most preferred embodiment of the invention, the non-finish side of the polymeric shell is bonded directly to the cross-linked thermosetting polymeric backing layer. This is accomplished by the cross-linking of styrene, which is present in the thermosetting polymeric backing layer, with the polymethylmethacrylate polymeric shell. This eliminates the need for both the silane based coupler and the fiber reinforced resin layer included in the first and second embodiments of the invention and described in the parent application. In addition, the most preferred embodiment of the invention does not include a weight bearing reinforcing structure, a plurality of reinforcing wooden planks positioned below the deck portion of the shell of the tub, or blind bolts and feet positioned below the floor portion of the shell of the tub.

The polymeric composite structure, preferably formed in the shape of the bathtub, is manufactured in accordance with the present invention. In the first embodiment of the invention, a polymeric shell is formed, preferably a thermoformable acrylic shell of polymethylmethacrylate, to a suitable shape such as the configuration of a bathtub. The non-finish side of the polymeric shell is preferably primed with the above-described silane based coupler. The primed or unprimed polymeric shell is then reinforced on its non-finish side with a resinous mixture of reinforcing fibers by suitable spray-up and roll down, or by other suitable techniques. After the reinforced shell has sufficiently cured, the shell is arranged in a mold with the non-finish side covering a weight bearing reinforcing structure, such as chip-board, placed below the weight bearing portion of the shell, for instance, the floor of the tub. Other reinforcing structures such as wooden boards may be placed below the deck of the shell.

An uncured mixture of unsaturated thermosetting polymeric backing material and cross-linking promoter, as described above, is injected into the mold at a sufficient pressure to force the backing material to coat the non-finish side of the shell and cover the fiber reinforcing material and the weight bearing reinforcing structures. The molded thermosetting polymeric backing material is cured at suitable temperatures and for a sufficient time to allow hardening and cross-linking of the thermosetting material and bonding of the fiber reinforcing layer to the non-finish side of the shell. After sufficient curing, the composite structure is removed from the mold for trimming.

In a second embodiment of the invention, the polymeric shell, preferably primed (or unprimed) is arranged in the molding cavity with the non-finish side covering a fibrous reinforcement, such as fiberglass or other fibrous mat. Preferably, an additional fiberglass mat may be placed between the weight bearing reinforcing structure, such as the chipboard, and the floor of the bathtub. The thermosetting polymeric material is injected into the mold, coating the non-finish side of the shell and embedding the fibrous mat and the weight bearing board to bond the fibrous reinforcement and the weight bearing materials to the non-finish side of the shell. It is also contemplated that the fibrous reinforcing material such as fiberglass mat may be inserted as a preformed fibrous structure made by a thermoforming process, or the spray-up of fiberglass and resin onto a suitably shaped screen.

In a third preferred embodiment of the invention, no fiber reinforcing layer is applied to the non-finish side of the shell. Rather, the polymeric material is bonded directly to the non-finish side of the shell as follows. Polyester resins, fillers and rheological agents are blended together in a drum. The mixture is distributed equally to separate amine injection and peroxide injection units where the separate mixtures are respectively combined with a promoter and catalyst. The combinations of mixtures are then combined in a mixer and injected by gravity into an inverted mold containing the polymeric shell. The thermosetting polymeric material coats the non-finish side of the shell, and bonds directly thereto.

Accordingly, it is an object of the invention to provide an improved composite molded structure.

Another object of the invention is to provide a lightweight polyester backed acrylic composite molded structure which has a solid feel and sound of the porcelain-coated cast iron and enameled fixtures.

A further object of the invention is to provide a composite molded structure which is resistant to damage and delamination when subjected to impact.

Still another object of the invention is to provide an improved apparatus for forming composite molded structures.

Still another object of the invention is to provide an improved method for manufacturing composite molded structures.

Yet another object of the invention is to provide a polyester backed acrylic composite molded structure which can be molded under low pressures without the need for expensive hydraulic mold press which is needed for RIM or RRIM molding.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
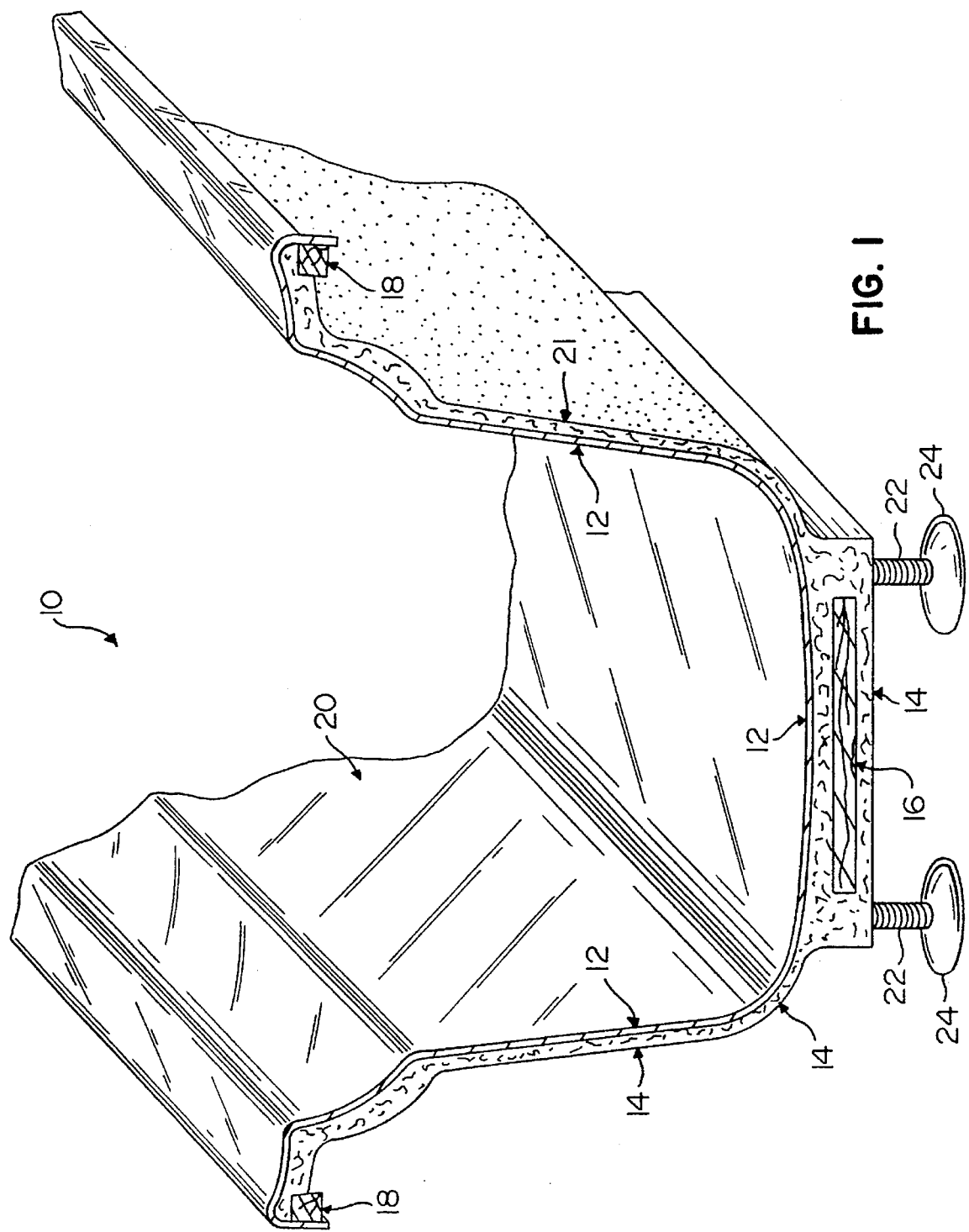
FIG. 1 is a schematic partial perspective cross-sectional view illustrating a first embodiment of the polyester backed acrylic composite bathtub of the present invention.

FIG. 1 illustrates a polyester backed acrylic composite molded structure constructed and arranged in accordance with the first and second embodiments of the invention. Preferably, the composite molded structure is in the configuration of a bathtub 10. Bathtub 10 includes a polymeric shell, preferably a thermoformable shell, most preferably an acrylic shell 12 having a polished finish side 20 which is normally exposed to the user. Acrylic shell 12 also includes a non-finish side 21 which is bonded to a molded thermosetting polymeric backing which does not contain isocyanate. In a preferred embodiment, the polymeric backing is a blended polyester backing material 14.

Additionally, a fiberglass, graphite fiber, carbon fiber, boron fiber, ceramic fiber, woolastonite fiber, aromatic polyamide fiber or similar reinforcing material (not shown) may be applied using spray-up techniques prior to molding. Alternatively, the fiber reinforcing material is molded to the acrylic shell 12 by the polyester backing material 14 during the molding process. A floor reinforcing means 16 preferably formed of chip-board, particle-board or plywood is molded into the polyester backing 14 below the acrylic shell 12 under the floor of the bathtub 10. Preferably, deck supporting means 18, such as wooden boards are molded under the deck area of the acrylic shell 12 within the polyester backing 14. It is especially preferred in the first and second embodiments of the invention to include blind bolts 22, which are positioned after the molding process has been completed, through a portion of the molded polyester backing material 14 and into the floor reinforcing means 16. Feet 24 are attached to the blind bolts 22 for supporting the weight of the tub, user and water during bathing.

Figure 2:
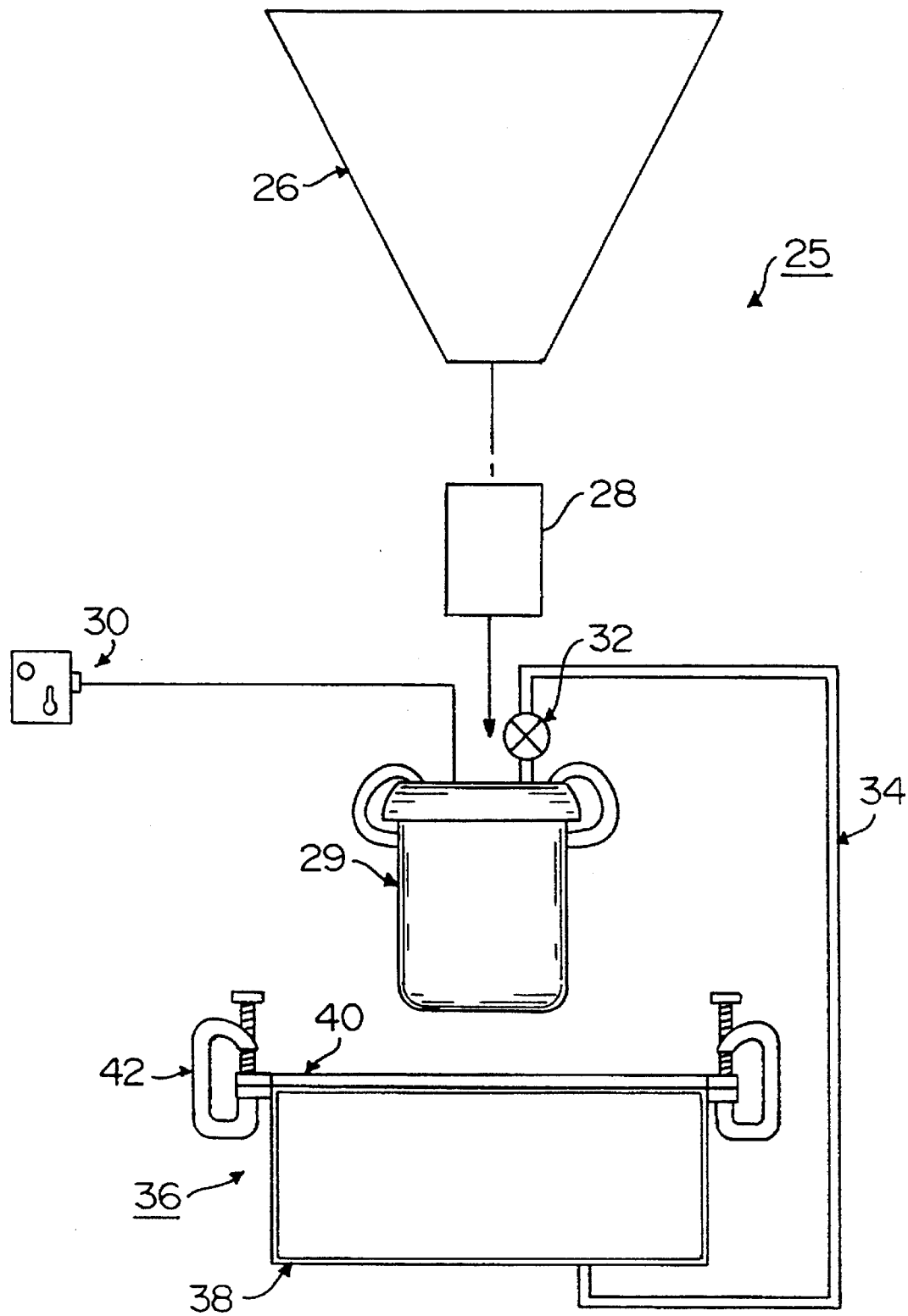
FIG. 2 is a schematic flow chart illustrating the low pressure resin transfer molding apparatus used to carry out the molding process for the first and second embodiments of the present invention.
Figure 3:
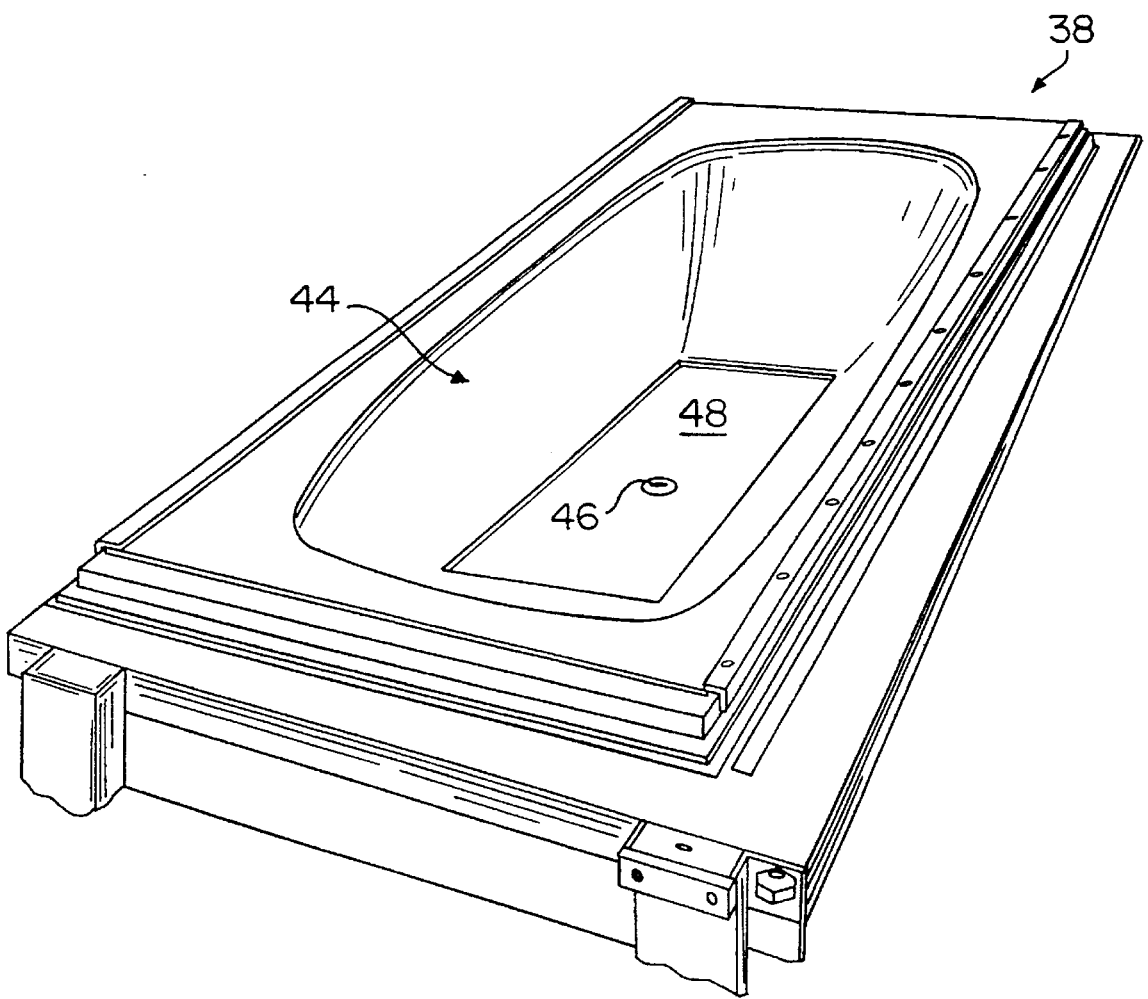
FIG. 3 is a top perspective view of the preferred molding receptacle in accordance with the present invention.

A schematic flow chart illustrating the preferred low pressure resin transfer molding (LPRTM) apparatus 25 suitable for carrying out the molding process of the present invention is shown in FIG. 2. Molding apparatus 25 includes mixer 26, such as a 110 gallon capacity NAUTA mixer manufactured by Daymixing Corp., Cincinnati, Ohio. The uncured, mixed polyester and filler backing material is transferred from mixer 26 to a pressure pot liner 28 which suitably fits within a pressure pot 29, Model No. QM 5744 both of which are manufactured by Devilbiss Corp., Toledo, Ohio. After the addition of cross-linking promoter, the pressure pot 29 is closed and compressed air 30 is pumped into the pressure pot 29. Once pressure pot 29 is sufficiently charged, throttle valve 32 is opened allowing the compressed air to force the uncured polyester and filler mixture through polymer delivery hose 34 and into mold 36. Preferably polymer delivery hose 34 is a flexible PVC hose having one (1") inch diameter which is disposed of and replaced following the molding process. FIGS. 2 and 3 illustrate mold 36 which preferably includes molding receptacle 38, formed from cast aluminum having a cavity for receiving the acrylic shell 12, leaving a molding space between the non-finish side 21 of acrylic shell 12 and an interior face 44 of the molding receptacle 38.

As illustrated in FIG. 3, molding receptacle 38 has a relatively smooth interior face 44 for forming the shape of the polyester backing 14, and is preferably formed from a material having good heat dissipating characteristics, such as cast aluminum. It is preferred that molding receptacle 38 also include a water jacket 45 or the like to regulate desired temperature of the mold 36 (see FIG. 4). The uncured polyester backing and filler mixture is introduced into the molding receptacle 38 from polymer delivery hose 34 into a molding aperture 46 which is located approximately in the geometric center of a portion of the molding receptacle 38 for molding the tub floor. As shown in FIG. 3, interior face 44 of molding receptacle 38 includes a rectangular indentation 48 of suitable dimension to retain tub floor reinforcement 16, preferably a rectangular piece of chip-board, or alternatively particle-board, plywood, wooden plank, fiberboard or a composite, plastic, fiberglass or other suitable weight bearing structural reinforcing material. The molding receptacle may suitably also include positioners or slots (not shown) for retaining deck supports 18, which preferably include wooden reinforcing 1" by 1" boards illustrated in FIG. 1.

Due to the low pressure molding process utilized in the present invention, mold seals are not required, and may actually impede the flow of the uncured polyester resin and filler mix into the cavity formed between the non-finish side 21 of the acrylic shell 12 and the interior face 40 of molding receptacle 38. Due to the absence of mold seals, there is some spillover of polyester backing material 14 and adherence of the hardened backing material to portions of the molding receptacle 38 due to the molding and curing process. Accordingly, hydraulic lifters are not ordinarily utilized. Rather, after the polyester backing 14 is sufficiently cured the molded tub is loosened or cut from the molding receptacle 38 and removed by hand.

Figure 4:
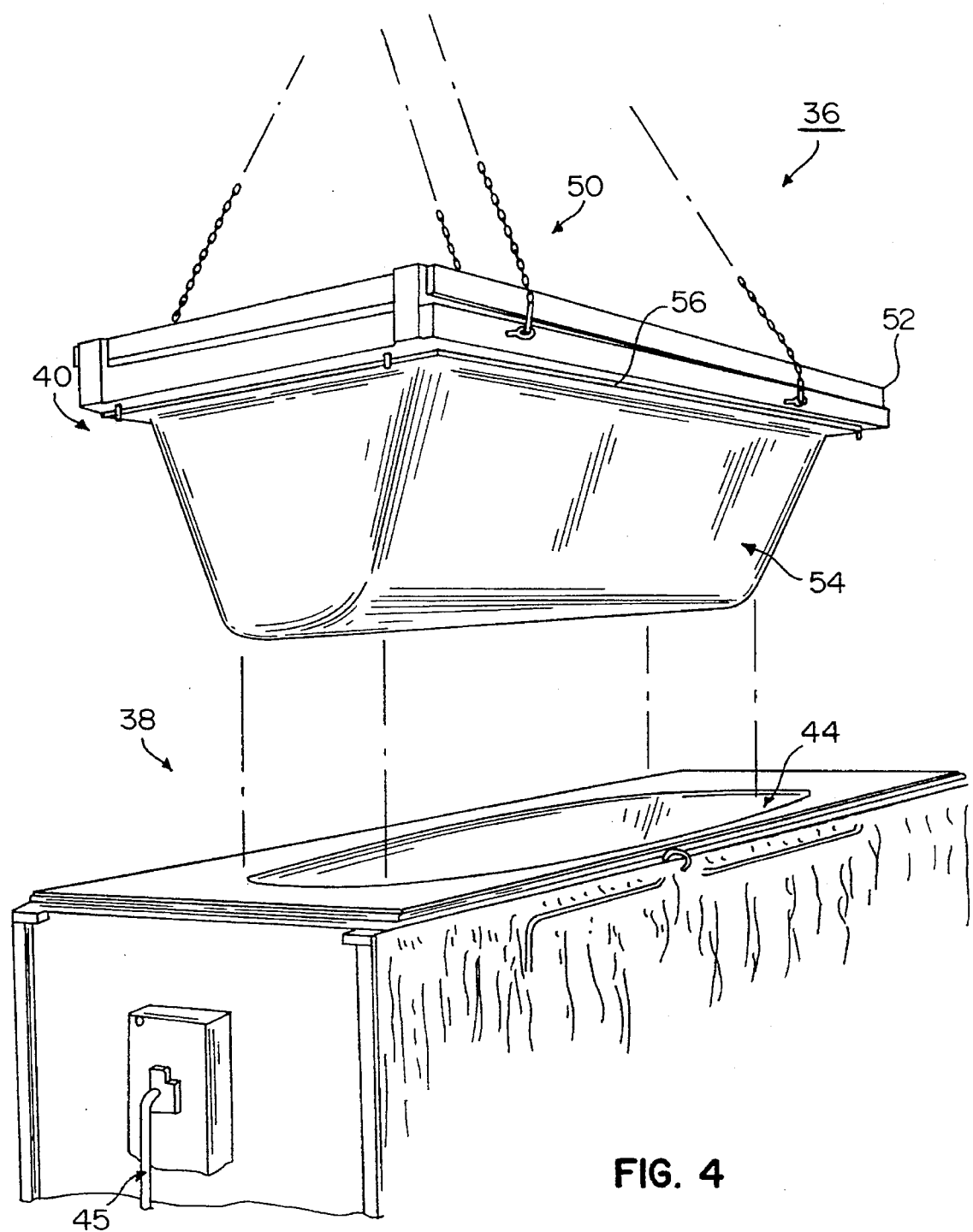
FIG. 4 is a perspective view of the mold according to the present invention shown in the open position, illustrating the molding receptacle, shell support and mold closing means of the present invention.

As further illustrated in FIG. 4, mold 36 also includes a shell support and mold closing means 40 which maintains the shape of the thin acrylic shell 12 during the molding process. Shell support and mold closing means 40 also hold acrylic shell 12 in proper orientation within molding receptacle 38. Mold 36 may be kept closed by an suitable means, however, the low molding and curing pressures used in the invention eliminates the necessity for the use of expensive hydraulic mold presses which are typically required in RIM and RRIM molding. For example, four C clamps 42, rated at 500 lbs. each, are entirely satisfactory for keeping mold 36 closed during the molding and curing process.

Mold 36 as viewed in the open position is illustrated in greater detail in FIG. 4, showing molding receptacle 38, and shell support and mold closing means 40 suitably held above molding receptacle 38 by mold opening and lifting means, such as chain hoist 50. Alternatively, other mold opening and closing means such as pivoting or levered systems, electro-mechanical or hydraulic mold clamps may be used instead of chain hoist 50 and clamps 42 during the molding process of the invention.

Referring to FIG. 4, shell support and mold closing means 40 is typically formed from cast aluminum core 52 which is coated with urethane skin 54. Shell support and mold closing means 40 conform to the shape of and supports finish side 20 of acrylic shell 12, without scratching or otherwise damaging the polished finish. Teflon strips 56, or other non-abrasive materials are included around the periphery of urethane skin 52 for contacting and urging a deck portion of acrylic shell 12 towards molding receptacle 38 during the molding process without causing damage to finish side 20 of the deck portion of acrylic shell 12. A detailed description of other suitable molding apparatus which may be adapted for use with the present invention is described in commonly assigned co-pending U.S. patent application Ser. No. 07/467,384, allowed Sep. 24, 1991, the disclosure of which is incorporated by reference herein.

Figure 5A:
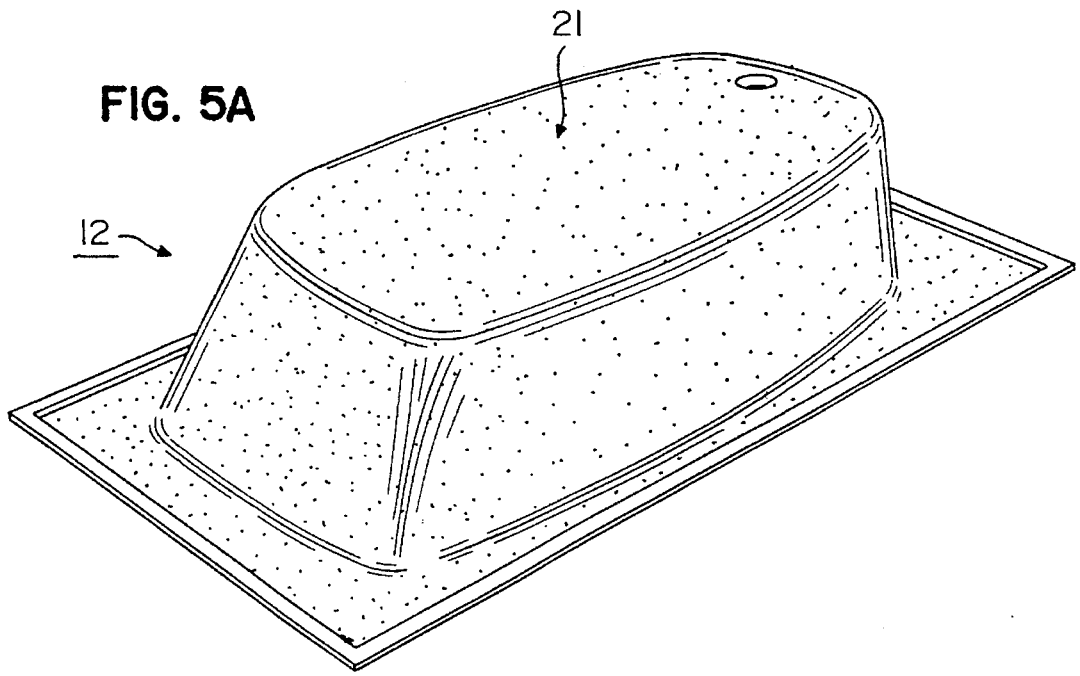
FIG. 5A shows the non-finish side of the acrylic shell of the present invention.

In accordance with the process of the present invention, acrylic shell 12 is formed from a cell cast acrylic sheet, preferably polymethylmethacrylate, and has a highly polished finish side and a non-finish side. Acrylic shell 12 preferably has a thickness of approximately 3.2 millimeters. The acrylic sheet may be made from other materials such as those described in U.S. Pat. Nos. 4,844,955 and 4,844,944 the disclosures of which are incorporated by reference herein. The acrylic sheet is thermoformed using well known vacuum thermoforming apparatus into the desired shape of acrylic shell 12 which is illustrated in FIG. 5A.

In the first and second embodiments of the invention, thermoformed acrylic shell 12 is preferably treated on non-finish side 21 with a bonding primer composition. One suitable primer composition includes a silane based primer AP-134, manufactured by Lord Corp. in Erie, Penn. It contains a silane compound at a 10% concentration in a solvent of 75% toluene, 5% butanol, 5% 2-butoxy ethanol and 5% ethyl alcohol. A suitable silane compound is 3[2(vinyl benzylamino)ethylamino] propyltrimethoxy silane at a preferred 10% concentration, although the concentration of this silane compound may range from about 1% to about 20%, preferably from about 5% to about 15%. The silane primer AP-134 is most preferably mixed at a 1% concentration by weight with 1% water, 9.8% styrene, 29.4% methylene chloride and 58.8% methylmethacrylate. The concentration of these components may range from about 0.1% to 10%, preferably from about 0.5% to about 2% silane primer such as AP-134; from about 0.1% to about 10%, preferably from about 0.5% to about 2.0% water; from about 0.1% to about 98%, preferably from about 5% to about 15%, styrene; from about 2.5% to about 98%, preferably from about 25% to about 35% methylene chloride; and from about 98% to about 5%, preferably from about 70% to about 40% methylmethacrylate.

The primer solution promotes cross-linking and improves bonding between the polyester reinforced backing and the non-finish side 21 of the acrylic shell, thereby providing for faster demolding times. Other compositions useful as bonding primer solutions are described in the above-referenced U.S. Pat. Nos. 4,844,955 and 4,844,944 to Graefe et al. However, if the demolding times are increased, or if sufficient bonding occurs during the spray up reinforcing step, the bonding primer is not necessary.

Figure 5B:
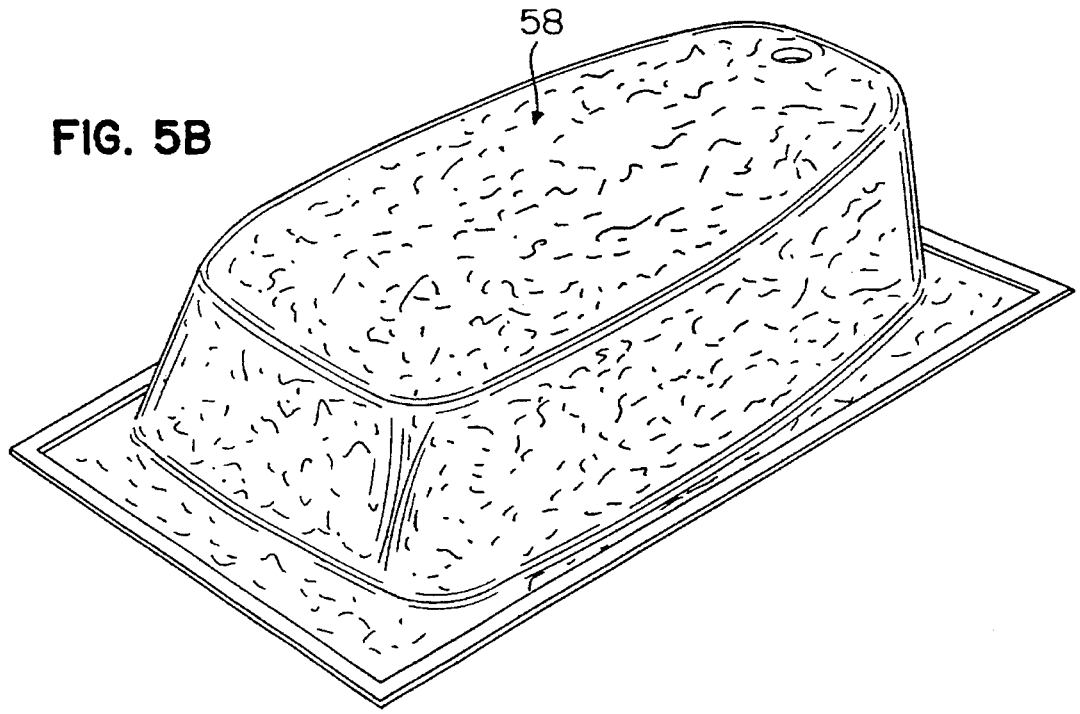
FIG. 5B shows the non-finish side of the acrylic shell for the first and second embodiments of the present invention after the application of fiberglass spray-up reinforcement.

The thermoformed and preferably primed acrylic shell 12 is reinforced with a resinous mixture of fibrous material, including chopped fiberglass, ceramic fibers, boron fibers, graphite or carbon fibers, woolastonite fibers, or aromatic polyamide fibers. It is preferred that the reinforcing materials include a sprayed on and rolled out mixture chopped fiberglass from about 10% to about 40%, preferably from about 15% to about 35%, and most preferably about 30% by weight; and polyester resin from about 60% to about 90%, preferably from about 85% to about 75%, and most preferably about 70% by weight. The sprayed on fiberglass is typically designated as fiberglass reinforced plastic (FRP) or glass reinforced plastic (GRP). The polyester resin preferably includes a mixture of a rigid unsaturated polyester resin designated as 31-439 by the Reichhold Corp. and a styrene monomer. 31-439 is an isophthalic/glycol polyester. The polyester resin may also include a flexible unsaturated resin designated 97-088 by Reichhold Corp. and a styrene monomer 97-088 is an isophthalic/glycol polyester. The polyester resin is combined with a curing or cross-linking promoter containing from about 0.01% to about 1%, preferably from about 0.05% to about 0.5%, most preferably about 0.2% cobalt naphthanate; and from about 0.1% to about 5%, preferably from about 0.5 to about 3%, most preferably about 1% methyl ethyl ketone peroxide, percentages based on weight of resin only. The resin and chopped fiberglass mixture is typically applied by suitable spray equipment such as Venus Model HI SSCW 2100 manufactured by Venus-Gusmer Corp., Kent, Wash. After curing for approximately one hour, reinforced acrylic shell 58 illustrated in FIG. 5B is placed in molding receptacle 38 with reinforcing weight bearing structures 16 and 18 placed below the tub floor and deck regions, respectively.

In the second embodiment of the invention, acrylic shell 12 is preferably primed and reinforced with a matted or woven fibrous reinforcing material, as described above. It is preferred that the matted or woven fibrous reinforcing material is a 1½ ounce (per square foot) fiberglass mat. The fibrous reinforcing material is placed inside the molding receptor, preferably below weight bearing floor supporting board 16, and another fiber reinforcing mat is placed above reinforcing board 16 and below floor of shell 12. The fiberglass or similar mat of fibrous reinforcing material is adhered to acrylic shell 12 during the molding step. A further alternative is that the fibrous reinforcing material is preformed prior to the molding step and placed as a single unit inside molding receptacle 38 prior to the placement of reinforcing board 16 and acrylic shell 12 within molding receptacle 38. Preforming of the fiberglass reinforcing material may be obtained using thermoformable fiberglass and plastic composite or similar fibrous composite using thermoforming techniques which are well known to those skilled in the art. Alternatively, preforming may be accomplished by spray-up of a resinous mixture of chopped fiberglass or other fibers onto a shaped mesh or screen by known techniques.

After the acrylic shell has been suitably arranged within the molding receptor, mold 36 is closed by placing the urethane coated surface 54 and TEFLON strips 56 of shell support and mold closing means 40 in suitable contact with finish-side 21 of acrylic shell 12. The mold is suitably clamped to provide sufficient venting by four heavy duty C clamps 42 to secure shell support and mold closing means 40 to molding receptacle 38. After the mold has been secured and properly vented, the temperature of the mold is stabilized between 100° and 120° F. using water jacket 45 in molding receptacle 38.

The low pressure resin transfer molding (LPRTM) process described below, is suitable for use in the first and second embodiments of the invention. However, other low pressure injection, gravity casting or displacement molding processes may also be suitably adapted for use in the present invention. The preferred resin, filler and catalyst formulation is also described below.

Typically, approximately 100 lbs. of material is mixed in mixer 26. The most preferred polyester resin and filler formulation includes the following percentages based on weight: rigid unsaturated polyester resin and styrene monomer, sold under the name Reichhold 31-439, 35.20%; flexible unsaturated polyester resin and styrene monomer sold under the name Reichhold 97-088, 11.90%; styrene monomer, 2.48%; calcium carbonate (filler), sold under the name Vicron 15—15, 49.6%; dimethylparatoluidene (DMPT) (activator/promoter), 0.6%; benzoyl peroxide, sold under the name Cadox 40 E (40% benzyl peroxide solution), 0.76%. It is preferred that the combination of materials range from about 0% to about 98%, preferably from about 25% to about 45% Reichhold 31-439; from about 98% to about 0%, preferably from about 20% to about Reichhold 97-008; from about 0% to about 40%, preferably from about 1% to about 10% styrene; from about 0% to about 75%, preferably from about 40% to about 60% Vicron 15—15; from about 0.05% to about 5%, preferably from about 0.2% to about 1% DMPT; and from about 0.05% to about 5%, preferably from about 0.2% to about 2% Cadox 40 E.

The ratio of resin to filler may range from no filler at all, or as high as 1:30, depending upon the type of filler used and the filler particle size. Preferably the ratio of resin to filler may be from about 2:1 to about 1:3. Other fillers may be added in addition to or instead of calcium carbonate, including aluminum trihydrate, glass spheres, sand, ceramic, mica, talc, silica and other suitable filling materials. Various other fillers are described in U.S. Pat. Nos. 4,844,955 and 4,844,944 to Graefe et al. which are incorporated by reference herein. Although the preferred polyester resin mixture is not foamed, foaming agents may be utilized to decrease the weight of the molded composite article.

Additionally, other polyester blends may be used with additional fillers, foaming agents and other catalysts without departing from the scope of the present invention, as long as the resin and catalyst formulations have a sufficient time to cure to allow low pressure molding of the molded article of present invention. The use of isocyanate in the resin system is undesirable since such compounds speed up the curing process to such an extent as to require high pressure and high speed molding processes, such as RIM or RRIM, thereby requiring use of the expensive RRIM and RIM high pressure molding apparatus.

Other suitable thermosetting polymeric materials can include epoxy, acrylic and vinyl esters and blends thereof which do not contain isocyanate. Additional useful resin compositions suitable for the present invention are also described in the aforementioned U.S. Pat. Nos. 4,844,944 and 4,844,955 to Graefe et al.

In preparing the preferred polyester resin for the first and second embodiments of the invention, the rigid unsaturated polyester and flexible unsaturated polyester resins are mixed in mixer 26 and the styrene monomer is then added. DMPT is also added and thoroughly mixed, and the filler material, such as calcium carbonate is then mixed typically for about 45 to 1½ hours. One hundred (100) pounds of the material is then dispensed into the lined pressure pot 29. Approximately ¾ pounds of benzoyl peroxide (CADOX 40 E) cross-linking promoter is added and mixed for about one minute. The pressure pot 29 is closed and pressurized by compressed air source 30 to about 5 psi. Throttle valve 32 is opened and the air pressure to the pressure pot 29 is increased to about 10 psi.

The air pressure is continuously increased by approximately 5 psi at one minute intervals up to a pressure of from about 20 to about 25 psi, the pressure is maintained for about 5 to 8 minutes until the mold is filled.

After the mold is filled and some resin mixture spills, the throttle valve is closed and the clamps are tightened to seal the mold.

The molded article is then cured. Curing time after the mold is filled for the above-described mixture is approximately 2 minutes to 22 minutes, preferably from about 2 minutes to about 6 minutes, but the molded structure may be maintained in the mold for longer times. If the silane based primer is not utilized, curing may range from about 45 minutes to 8 or more hours when cured overnight. The longer cure times provide a stronger bond to be formed between the polyester resin and non-finish side 21 of the acrylic shell. After curing has been completed, mold 36 is opened and shell support mold closing means 40 is removed. Any overflow of hardened polyester resin adhering to the outside of molding receptacle 38 is cut away and molded bathtub 10 is removed by hand from molding receptacle 38.

Figure 6:
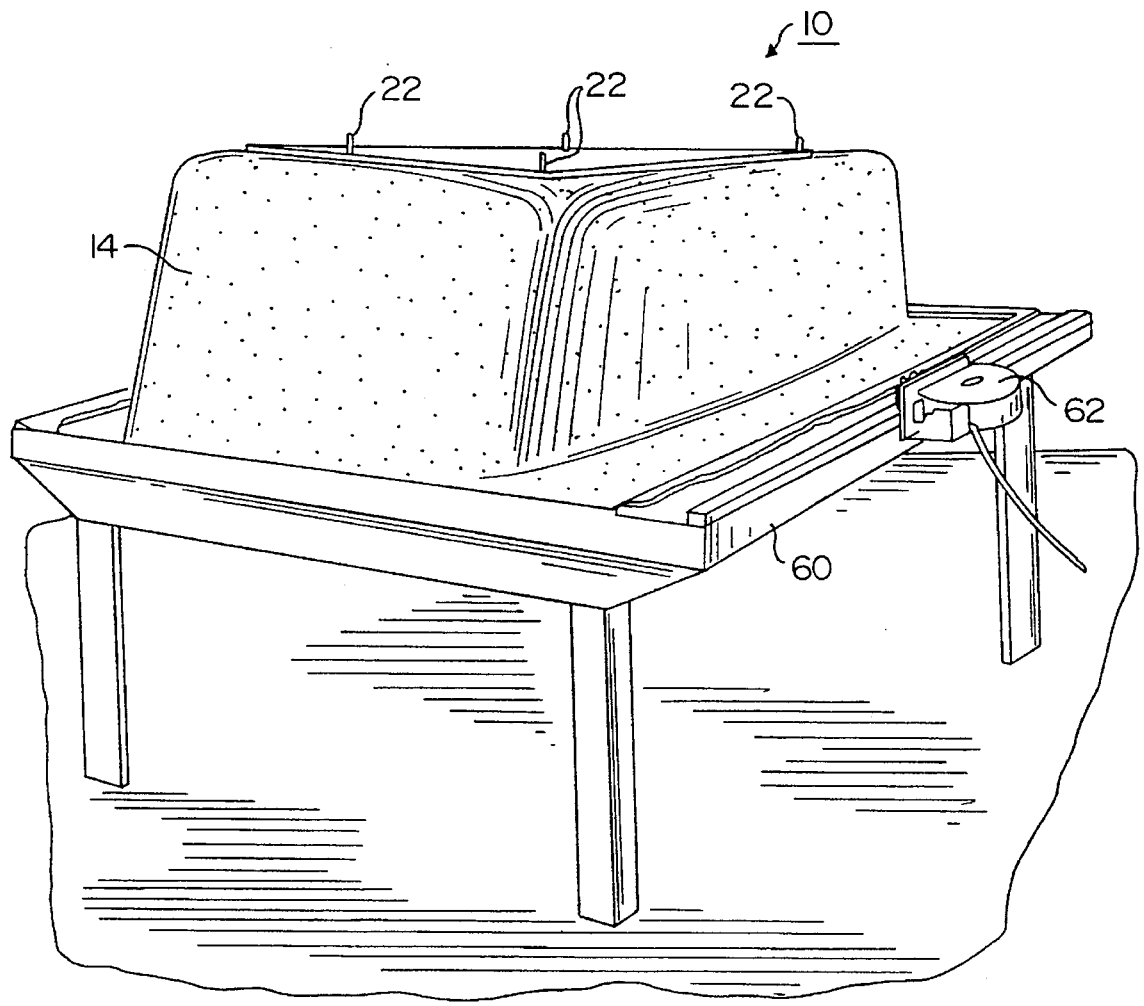
FIG. 6 shows the freshly demolded polyester backed acrylic composite bathtub of the present invention positioned on a trimming table with a horizontally oriented circular saw for trimming excess polyester backing produced during the molding process, shown with blind bolts in place.
Figure 7A:
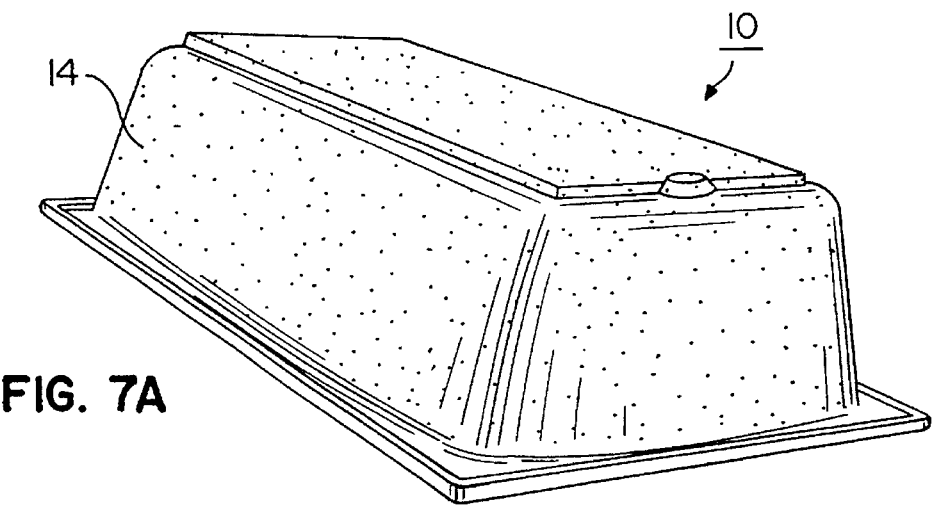
FIGS. 7A, 7B and 7C are orthogonal views of the trimmed polyester backed acrylic composite bathtub of the present invention, shown without the blind bolts in place.
Figure 7B:
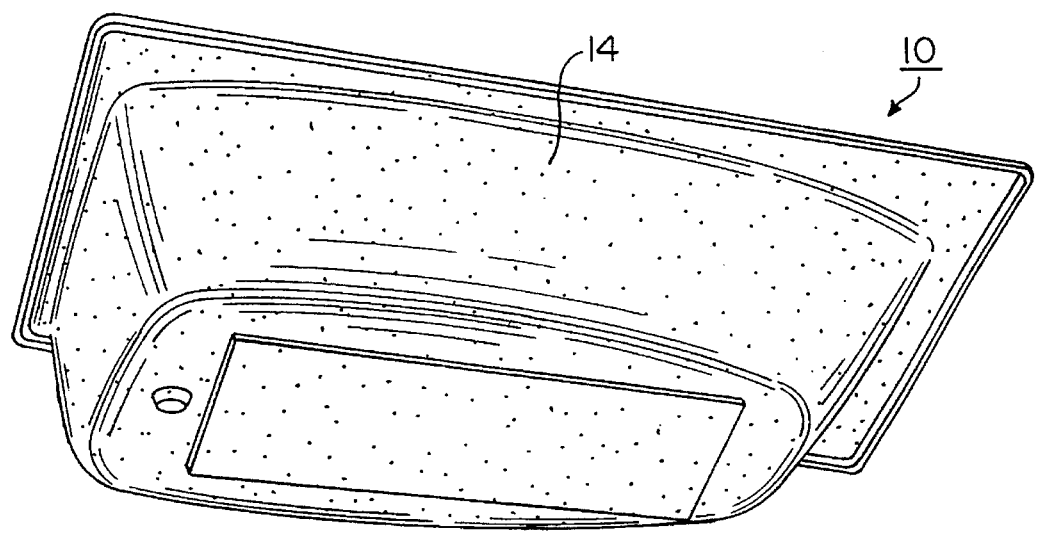
Figure 7C:
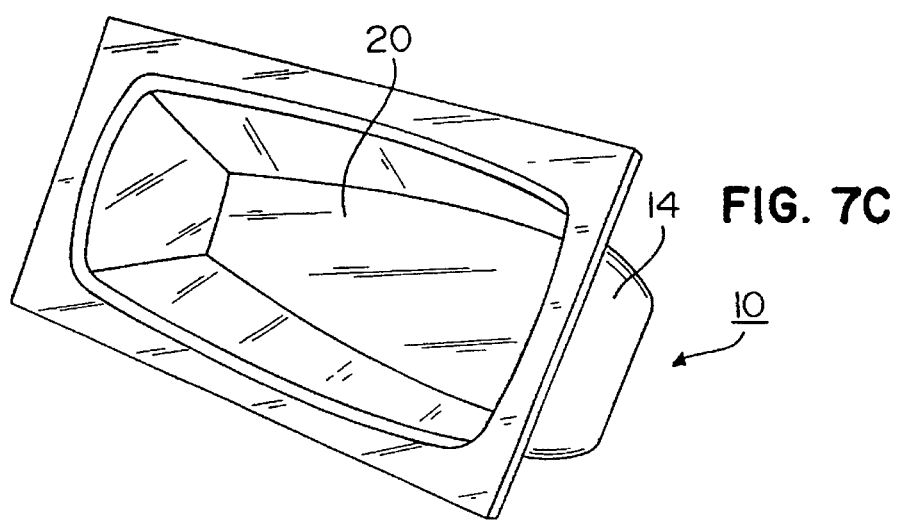

As shown in FIG. 6, freshly demolded bathtub 10 is trimmed of excess polyester hardened backing material 14 using suitable equipment such as trimming table 60 and horizontally mounted circular saw 62. The finished polyester backed composite bathtub 10 of the first and second embodiments of the invention is shown in FIGS. 7A through 7C. Blind bolts 22 and feet 24, illustrated in FIGS. 1 and 6 are inserted on the bottom surface of the bathtub through the molded polyester backing 14 and into deck supporting board 18.

In the first and second embodiments of the invention, it is preferred that acrylic shell 12 has a thickness of about 3.2 millimeters while the fiber reinforcement is typically from about 1.0 to 2.0 millimeters measured from non-finish side 21 of the shell. Typically the total thickness of the molded bathtub is about 8 to 10 millimeters in the side wall region and about 20–25 millimeters on the floor region. The total thickness of the deck region may range from about 5 millimeters to about 35 millimeters, preferably from about 8 millimeters to about 30 millimeters. The thickness of the polyester molded material in the walls is typically from about 4.4 to about 7 millimeters. The preferred tub floor support weight bearing reinforcing structure is typically made from chip-board, particle-board, plywood or wooden plank having a preferred thickness of about ⁷⁄₁₆ inches, but may range from about ¼ inch to about ½ half of an inch in thickness, depending on the desired thickness of the floor of the molded article and its underlying backing. The preferred deck supports are typically 1 inch×1 inch wooden boards as illustrated in FIG. 1.

Figure 8:
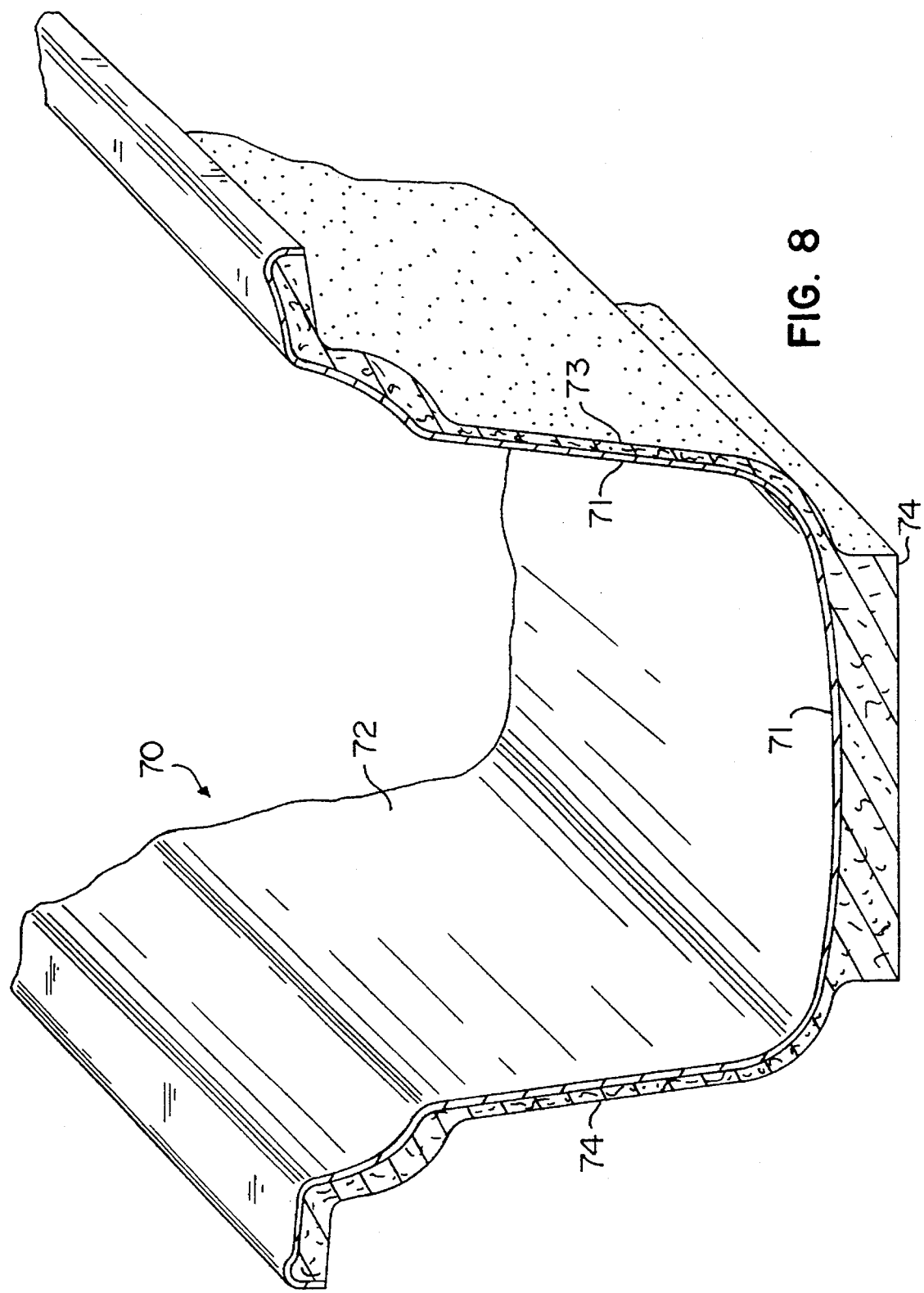
FIG. 8 is a schematic partial perspective cross-sectional view illustrating the third and preferred embodiment of the polyester backed acrylic composite bathtub of the present invention.

Reference is now made to FIG. 8 which illustrates a composite molded structure constructed and arranged in accordance with the third and most preferred embodiment of the invention. It is preferred that the composite molded structure is in the configuration of bathtub 70, similar to bathtub 10 described in the first and second embodiments of the invention. Bathtub 70 includes a polymeric shell, preferably a thermoformable shell, and most preferably an acrylic shell 71 having polished finish side 72, which is normally exposed to the user. Acrylic shell 71 also includes non-finish side 73 which is directly bonded to a molded thermosetting isocyanate-free polymeric backing. Preferably, the thermosetting polymeric backing is a blended backing material 74.

In contrast to the first and second embodiments, the method and apparatus used to manufacture the most preferred embodiment of the invention does not require or use a fiber reinforcing material molded to acrylic shell 70. Rather, the non-finish side of acrylic shell 70 has a surface as illustrated in FIG. 5A, and does not include the application of fiberglass spray-up as shown in FIG. 5B. In addition, the most preferred embodiment does not include fiber reinforcing means 16, deck supporting means 18, blind bolts 22 or feet 24. Moreover, the most preferred embodiment of the invention does not require a silane coupling agent which has traditionally been used to chemically bond plastic to a shell.

Figure 9:
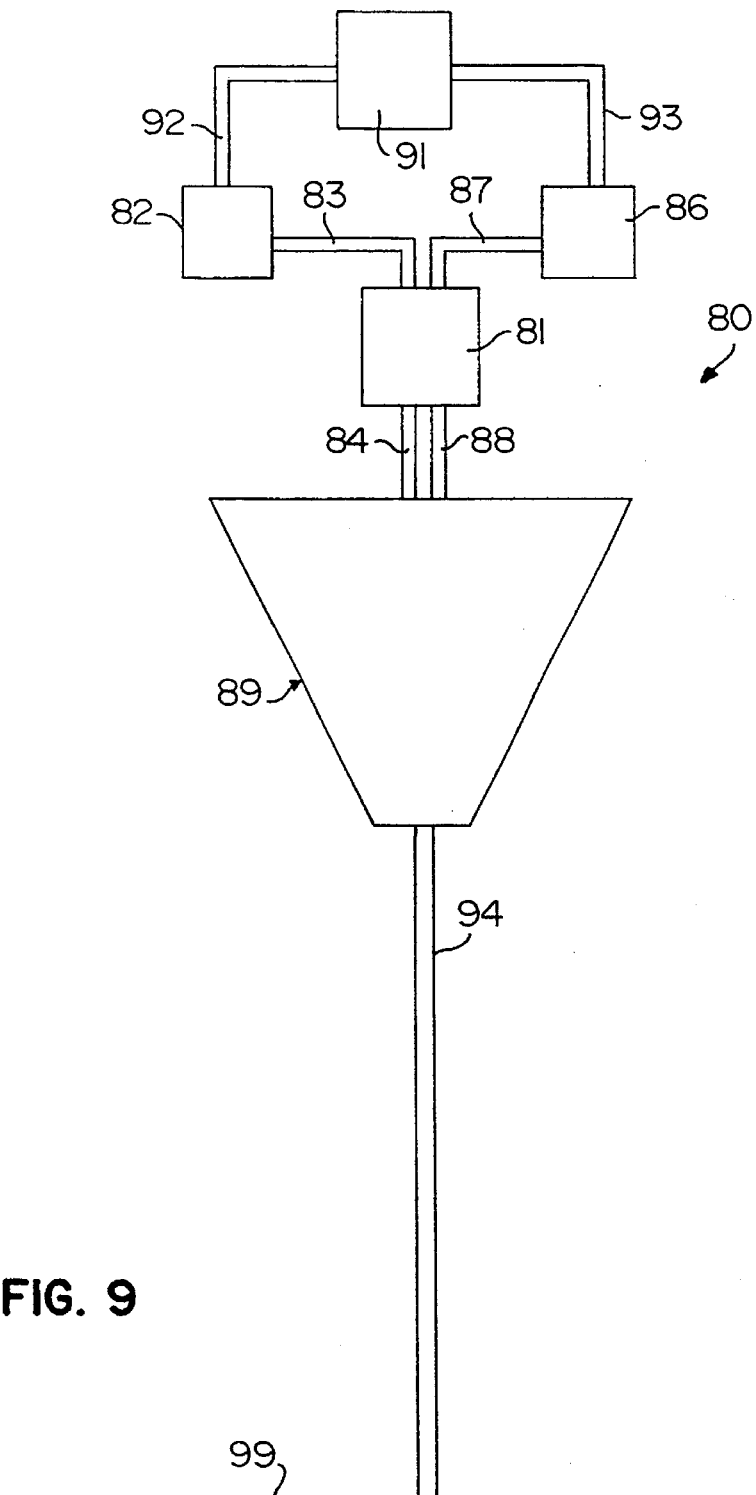
FIG. 9 is a schematic flow chart illustrating the low pressure resin transfer molding apparatus used to carry out the molding process for the preferred embodiment of the present invention.
Figure 9:
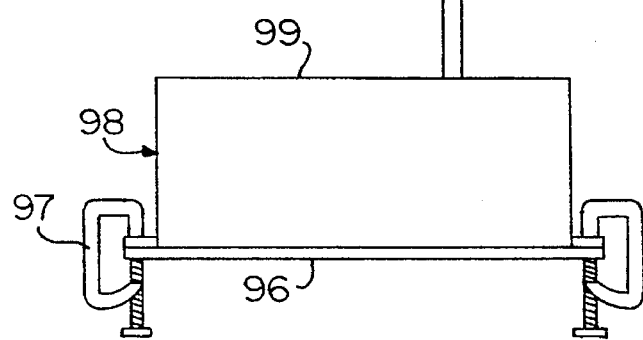

FIG. 9 is a schematic flow chart illustrating the preferred liquid injection molding apparatus 80 suitable for use in the molding process of the most preferred embodiment of the invention. Molding apparatus 80 includes a drum 91 or the like containing a blend of primary polyester resin, filler and any desired rheological agents. The mixture is divided and evenly distributed through polymer delivery hoses 92, 93 to amine injection unit 82 and peroxide injection unit 86, respectively.

Amine injection unit 82 and peroxide injection unit 86 include injection unit pumps which meter the proper ratio of the two mixtures to static mixer 89. Injection units 82, 86 also include hydraulic proportioners which convert compressed air to hydraulic power to drive the injection unit pumps.

The mixture from polymer delivery hose 92 is blended with a promoter in amine injection unit 82. Similarly, the mixture from polymer delivery hose 93 is combined with a catalyst in peroxide injection unit 86. Both mixtures are transported to boom assembly 81 through polymer delivery hoses 83, 87. Boom assembly 81 includes a mixing head and support for polymer delivery hoses 83, 87. Boom assembly 81 additionally allows static mixer 89 to be moved from one mold to the next mold during manufacturing.

The mixtures, which are still separate, are then transported from boom assembly 81 to static mixer 89 through polymer delivery hoses 84, 88, where the amine and peroxide resins contact and mix with each other for the first time. Static mixer 89 provides thorough and uniform mixing of the mixtures from amine injection unit 82 and peroxide injection unit 86 such that a chemical reaction is initiated.

The blended mixture exits static mixer 89 through polymer delivery hose 94 to mold 98. As further illustrated in FIG. 9, mold 98 is inverted such that molding receptacle 99 is positioned below mold closing means 96 and clamps 97. Thus, the polymer resin mixture can be injected into mold 98 by gravity. The mixture is thoroughly mixed when it reaches mold 98. Mold 98 is filled and within 2½ to 3 minutes from the initiation of the chemical reaction, the liquid resin forms a gel. Within about 9 minutes, the material is sufficiently cured to allow removal of the composite structure from the mold. Thus, one cycle can be completed within approximately 15 minutes in accordance with the third embodiment of the invention.

After the mold is sufficiently cured, a blast of compressed air from the male side of the mold is used to release the female mold member containing the molded structure. Ejector mechanisms on the female mold member are used to separate the male and female mold members. The normal mode of operation continues until a solvent flush is necessary to remove excess material from static mixer 89 before the mixture gels.

The method used in manufacturing composite molded structures in accordance with the third and most preferred embodiment of the invention provides several advantages over the first and second embodiments as well as over the prior art. First, the mixtures from amine injection unit 82 and peroxide injection unit 86 are kept separate until entering static mixer 89. This maintains the system as a liquid and prevents contamination. In addition, reaction time is increased, without the use of isocyanate. Accordingly, manufacturing efficiency is increased without requiring the use of expensive RRIM or RIM high pressure molding apparatus.

Second, the method used in accordance with the third embodiment of the invention eliminates the need for the use of a fiber reinforcing layer bonded to acrylic shell 70. This can be attributed to the use of amine injection unit 82 and peroxide injection unit 86 to create free radicals. The free radicals react with free sites on the polyester, thereby permitting cross-linking of the styrene during the molding process. The elimination of the fiber reinforcing material provides a product having an enhanced finished appearance. Additionally, the molded composite structure produced in accordance with the third embodiment does not require any wooden inserts.

Third, silane coupling agents which have previously been used to chemically bond plastic to the shell by the creation of chemical linkages are no longer necessary. Consequently, many of the disadvantages previously associated with the use of silane primers are eliminated. One such disadvantage has occurred where manufacturing conditions render silane primers ineffective due to the solvent or carrier drying off too quickly, thereby resulting in complete hydrolysis to silanol prior to bonding. As a result, bonding is rendered ineffective.

Fourth, molding receptacle 38 and shell support and mold closing means 40 are typically formed from cast aluminum, as discussed in the first and second embodiments of the invention. However, the third embodiment of the invention allows the use of a lightweight, but rigid polyester composite mold structure, such as male and female mold members formed from layers of polyester, impregnated glass, and end grained balsa sandwiched therebetween. Accordingly, the method of manufacturing a composite molded structure in accordance with the third embodiment of the invention reduces the need for large investments in hard tooling. Additionally, the composite molding structure is lightweight. Accordingly, the use of the hard tooling and the molding process of the method of manufacturing the acrylic composite molded structure of the third embodiment of the invention reduces manufacturing costs while increasing manufacturing efficiency.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A self-supporting polymeric composite sanitary fixture consisting essentially of:

a polymeric shell layer having a finish-side and a non-finish side; and a single cross-linked thermosetting polymeric backing layer which is simultaneously molded to conform to the shape of and bonded directly to essentially the entire non-finish side of said polymeric shell layer, said thermosetting polymeric backing layer consisting essentially of at least one component selected from the group consisting of polyester, epoxy, acrylic, vinyl esters and blends thereof, styrene, a curing prometer, a peroxide cross-linking prometer, and a filler, said cross-linked thermosetting polymeric backing layer having sufficient structural strength, eliminating the need for additional reinforcing layers, isocyanate and silane coupling agent.

2. The polymeric composite structure as recited in claim 1, wherein said polymeric shell layer is an acrylic polymer of polymethylmethacrylate.

3. The polymeric composite structure as recited in claim 1, wherein said cross-linked thermosetting backing layer, prior to curing comprises a rigid unsaturated polyester resin, a flexible unsaturated polyester resin, a curing promoter, a peroxide cross-linking promoter and a filler in a ratio of from about 2:1 resin to filler, up to about a ratio of about 1:30 resin to filler.

4. The polymeric composite structure as recited in claim 3, wherein said filler is selected from the group consisting of calcium carbonate, aluminum trihydrate, glass spheres, sand, ceramic, mica, talc, silica, and mixtures thereof.

5. The polymeric composite structure as recited in claim 1, having the configuration of a bathtub.

* * * * *